(12) United States Patent
Bang et al.

(10) Patent No.: US 9,859,772 B2
(45) Date of Patent: Jan. 2, 2018

(54) MOTOR

(71) Applicant: Samsung Electronics Co., Ltd., Suwon-si (KR)

(72) Inventors: Myung Bae Bang, Pyeongtaek-si (KR); Tae Sang Park, Suwon-si (KR); Nam Su Kim, Seoul (KR); Young Kwan Kim, Anyang-si (KR); Byung Ryel In, Suwon-si (KR); Deok Jin Kim, Hwaseong-si (KR); Seung Yeol Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 375 days.

(21) Appl. No.: 14/605,379

(22) Filed: Jan. 26, 2015

(65) Prior Publication Data
US 2015/0211548 A1 Jul. 30, 2015

(30) Foreign Application Priority Data

Jan. 29, 2014 (KR) ........................ 10-2014-0011616

(51) Int. Cl.
| | | |
|---|---|---|
| *H02K 9/06* | (2006.01) | |
| *F04D 29/58* | (2006.01) | |
| *F04D 25/06* | (2006.01) | |
| *F04D 25/08* | (2006.01) | |

(Continued)

(52) U.S. Cl.
CPC .............. *H02K 9/06* (2013.01); *F04D 25/06* (2013.01); *F04D 25/082* (2013.01);
(Continued)

(58) Field of Classification Search
CPC .. F04D 29/5813; F04D 25/06; F04D 29/5806; F04D 25/082; F04D 29/4253;
(Continued)

(56) References Cited

U.S. PATENT DOCUMENTS

| | | | | |
|---|---|---|---|---|
| 4,773,829 A | * | 9/1988 | Vettori ..................... | H02K 7/14 310/68 R |
| 5,006,744 A | * | 4/1991 | Archer ................... | H02K 11/33 310/58 |

(Continued)

FOREIGN PATENT DOCUMENTS

| | | |
|---|---|---|
| EP | 0766366 | 4/1997 |
| EP | 2562425 | 2/2013 |

OTHER PUBLICATIONS

Extended European Search Report dated Jun. 8, 2016 in European Patent Application No. 15152891.6.

*Primary Examiner* — Mohamad Musleh
(74) *Attorney, Agent, or Firm* — Staas & Halsey LLP

(57) ABSTRACT

A motor includes a control part assembly having an air inlet through which air is inlet, an air flow path configured to communicate with the air inlet, and a printed circuit board; and a motor part assembly having a stator configured to generate magnetic flux when a current is applied, a rotor structured to be rotated while interacting with the stator electromagnetically, a motor shaft provided to be rotated together with the rotor, and an impeller coupled to the motor shaft and provided to be rotated to generate air flow, and is configured to be detachably coupled to the control part assembly. Through the structure as such, the performance of the motor may be improved.

27 Claims, 17 Drawing Sheets

(51) Int. Cl.
*F04D 29/42* (2006.01)
*H02K 9/22* (2006.01)
*H02K 5/04* (2006.01)
*H02K 5/15* (2006.01)
*H02K 5/173* (2006.01)
*H02K 9/14* (2006.01)
*H02K 11/33* (2016.01)

(52) U.S. Cl.
CPC ..... *F04D 29/4253* (2013.01); *F04D 29/5806* (2013.01); *F04D 29/5813* (2013.01); *H02K 5/04* (2013.01); *H02K 5/15* (2013.01); *H02K 5/1732* (2013.01); *H02K 9/14* (2013.01); *H02K 9/22* (2013.01); *H02K 11/33* (2016.01); *Y10T 29/49012* (2015.01)

(58) Field of Classification Search
CPC .. H02K 5/04; H02K 5/15; H02K 9/22; H02K 9/14; H02K 11/33; H02K 9/06; H02K 5/1732; Y10T 29/49012
See application file for complete search history.

(56) References Cited

U.S. PATENT DOCUMENTS

| | | | | |
|---|---|---|---|---|
| 5,327,064 | A * | 7/1994 | Arakawa | H02K 29/08 307/117 |
| 5,435,702 | A | 7/1995 | Koyama et al. | |
| 5,932,942 | A * | 8/1999 | Patyk | H02K 11/33 310/58 |
| 6,011,331 | A * | 1/2000 | Gierer | H02K 29/06 310/52 |
| 7,646,118 | B2 * | 1/2010 | Yoshida | H02K 11/33 30/276 |
| 2005/0073210 | A1 | 4/2005 | Rocky et al. | |
| 2006/0024170 | A1 | 2/2006 | Foulonneau | |
| 2006/0071566 | A1 | 4/2006 | Ha | |
| 2011/0150674 | A1* | 6/2011 | Furlan | F04D 13/0666 417/353 |
| 2013/0052051 | A1* | 2/2013 | Clothier | F04D 25/06 417/366 |

* cited by examiner

MOTOR

CROSS-REFERENCE TO RELATED APPLICATIONS

This application claims the priority benefit of the Korean Patent Application No. 10-2014-0011616, filed on Jan. 29, 2014, in the Korean Intellectual Property Office, the disclosure of which is incorporated herein by reference.

BACKGROUND

1. Field

The following description relates to a motor, and more particularly, a motor having an improved structure to enhance performance.

2. Description of the Related Art

In general, a vacuum cleaner is a household appliance configured to filter foreign substance inside a body of the vacuum cleaner after inletting air having the foreign substance, such as dust, by use of vacuum pressure being generated by use of a motor mounted inside the body.

The motor is configured to generate an intake force by lowering inside pressure while discharging the air inside the vacuum cleaner. The intake force generated as such is provided such that a foreign substance, such as dust, on a surface to be cleaned may be introduced through an inlet and then removed by use of a dust collecting apparatus.

A motor is an apparatus configured to obtain rotational force from electrical energy, and is provided with a stator and a rotor. The rotor is structured to electromagnetically react with the stator, and is rotated by use of force being applied between a magnetic field and a current that flows at a coil.

SUMMARY

Therefore, it is an aspect of the present disclosure to provide a motor configured to improve an assembly structure and to minimize a misalignment of a concentricity of the motor.

It is an aspect of the present disclosure to provide a motor having improved heat radiation efficiency and provided to be easily maintained and repaired.

Additional aspects of the disclosure will be set forth in part in the description which follows and, in part, will be obvious from the description, or may be learned by practice of the disclosure.

In accordance with an aspect of the present disclosure, a motor includes a control part assembly and a motor part assembly. The control part assembly may have an air inlet through which air is introduced, an air flow path configured to communicate with the air inlet, and a printed circuit board. The motor part assembly may have a stator configured to generate magnetic flux when a current is applied, a rotor structured to be rotated while electromagnetically interacting with the stator, a motor shaft provided to be rotated together with the rotor, and an impeller coupled to the motor shaft and provided to be rotated to generate air flow, the motor part assembly configured to be detachably coupled to the control part assembly.

The motor part assembly may include a diffuser unit configured to increase velocity of flow of the air being introduced by use of the impeller while fixed together with the stator.

The diffuser unit may include a unit body configured to be coupled to the motor shaft by use of a bearing. A plurality of assembly protrusions may form a concentricity with respect to a central portion of the stator and disposed while spaced apart from each other in a circumferential direction along a circumference of the unit body such that the plurality of assembly protrusions is coupled to the stator.

The stator may include a plurality of insertion holes corresponding to the plurality of assembly protrusions allowing the plurality of assembly protrusions to be inserted thereinto.

The motor part assembly may further include a lower housing having an air outlet configured to exhaust the air being introduced from the air inlet. The lower housing may include a plurality of housing protrusions coupled to the stator to face the plurality of assembly protrusions and disposed along a circumferential direction while spaced apart from each other.

The lower housing may include a mounting recess concavely formed from the lower housing along an outer side of the lower housing. The motor part assembly may further include an upper housing having a shroud configured to guide the air being introduced to the impeller and the diffuser unit, and having one end portion thereof mounted along the mounting recess.

The motor part assembly may include a pair of balancers provided on the motor shaft at an upper side and a lower side with respect to the rotor to prevent eccentric rotations of the rotor.

The control part assembly may include a heat sink at which an electronic element coupled to the printed circuit board and disposed at the printed circuit board, and configured to form the air flow path.

The printed circuit board may include a penetration hole configured to penetrate an upper surface and a lower surface. The heat sink may be perpendicularly disposed along the surroundings of the penetration hole with respect to the printed circuit board.

The heat sink may include an inner side surface provided with a cross section thereof in the shape of a circle to form the air flow, and a plurality of outer side surfaces provided at an opposite side of the inner side surface and formed in the shape of a plane surface such that the electronic element is attached.

The heat sink may include a plurality of heat sinks evenly parallel to each other in a circumferential direction. The plurality of heat sinks may include an inner side surface formed in the shape of a curve to form the air flow. An outer side surface may be provided at an opposite side of the inner side surface and formed in the shape of a plane surface such that the electronic element is attached.

The heat sink may include a coupling protrusion in the shape of a pin protruding lengthways to couple to the printed circuit board.

The heat sink may further include an element coupling hole configured to penetrate the inner side surface and the outer side surface to be rivet-coupled to the electronic element.

The heat sink may be formed with aluminum material.

The control part assembly may further include an inductor disposed to face the printed circuit board and provided to ease rapid changes of current at the printed circuit board.

The motor part assembly may include an impeller, a diffuser unit, and an upper housing. The impeller may be rotatably provided while coupled to the rotor. The diffuser unit may be configured to increase velocity of the air that flows from the impeller while fixed together with the stator. The upper housing may have a shroud configured to guide the air being introduced to the impeller and the diffuser unit.

By the coupling of the motor part assembly and the control part assembly, the inductor may be disposed at an upper surface of the upper housing.

The motor may further include a fixing pad provided in the form of insulated material between the inductor and the upper housing such that the inductor is fixed to the fixing pad.

The motor may further include a plurality of bearings disposed along the motor shaft, and the unit body may be configured to rotatably support the motor shaft by use of the plurality of bearings.

The motor part assembly may include an impeller, a diffuser unit, and an upper housing. The impeller may be rotatably provided while coupled to the rotor. The diffuser unit may be configured to increase velocity of the air that flows from the impeller while fixed together with the stator. The upper housing may have a shroud configured to guide the air being introduced to the impeller and the diffuser unit. By the coupling of the motor part assembly and the control part assembly, the printed circuit board may be disposed at an upper surface of the upper housing.

In accordance with an aspect of the present disclosure, a method of assembling a motor includes: coupling a motor shaft having coupled with a rotor, an impeller rotatably provided together with the motor shaft, and a diffuser unit being coupled to the motor shaft by use of a bearing; and coupling the diffuser to one side of a stator by inserting a plurality of coupling protrusions provided along a circumferential direction of the diffuser into a plurality of coupling grooves formed along an outer side of the stator such that the rotational center of the motor shaft is aligned with the central portion of the stator.

A pair of balancers may be coupled at the motor shaft in vertical directions with respect to the rotor to prevent eccentric rotations of the rotor.

A lower housing may be coupled to an opposite side of the stator. An upper housing having a shroud may be coupled at the lower housing to surround the diffuser. A control part assembly configured to deliver electrical signals to the rotor may be coupled to an upper portion of the upper housing.

The control part assembly may include a printed circuit board provided with a penetration hole formed thereto, and a heat sink coupled to the printed circuit board and configured to form air flow while disposed in a circumferential direction along the penetration hole. The control part assembly may be coupled to the motor part assembly such that an end portion of the heat sink and an end portion of the shroud are aligned with each other.

In accordance with an aspect of the present disclosure, a motor includes a motor part assembly and a control part assembly. The motor part assembly may have a stator configured to generate a magnetic flux when a current is applied, a rotor structured to be rotated while interacting with the stator electromagnetically, a motor shaft provided to rotate along the rotor, and an impeller rotatably provided to generate air flow while coupled to the motor shaft. The control part assembly may be disposed at one side of the motor part assembly. The control part assembly may include a printed circuit board and a heat sink. The printed circuit board may be configured to transmit electrical signals. The heat sink may be coupled to the printed circuit board, and on which an outer side surface one side of a heat element being disposed at the printed circuit board may be attached, and which an inner side surface may form an air flow path such that the air being introduced by use of the impeller flows.

The printed circuit board may include a penetrating hole configured to penetrate an upper surface and a lower surface. The heat sink may be perpendicularly disposed along the surroundings of the penetration hole with respect to the printed circuit board.

The heat sink may include a plurality of heat sinks provided parallel to each other in a circumferential direction. The plurality of heat sinks may include an inner side surface formed in the shape of a curve to form the air flow; and an outer side surface provided at an opposite side of the inner side surface and formed in the shape of a plane surface such that the electronic element is attached.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
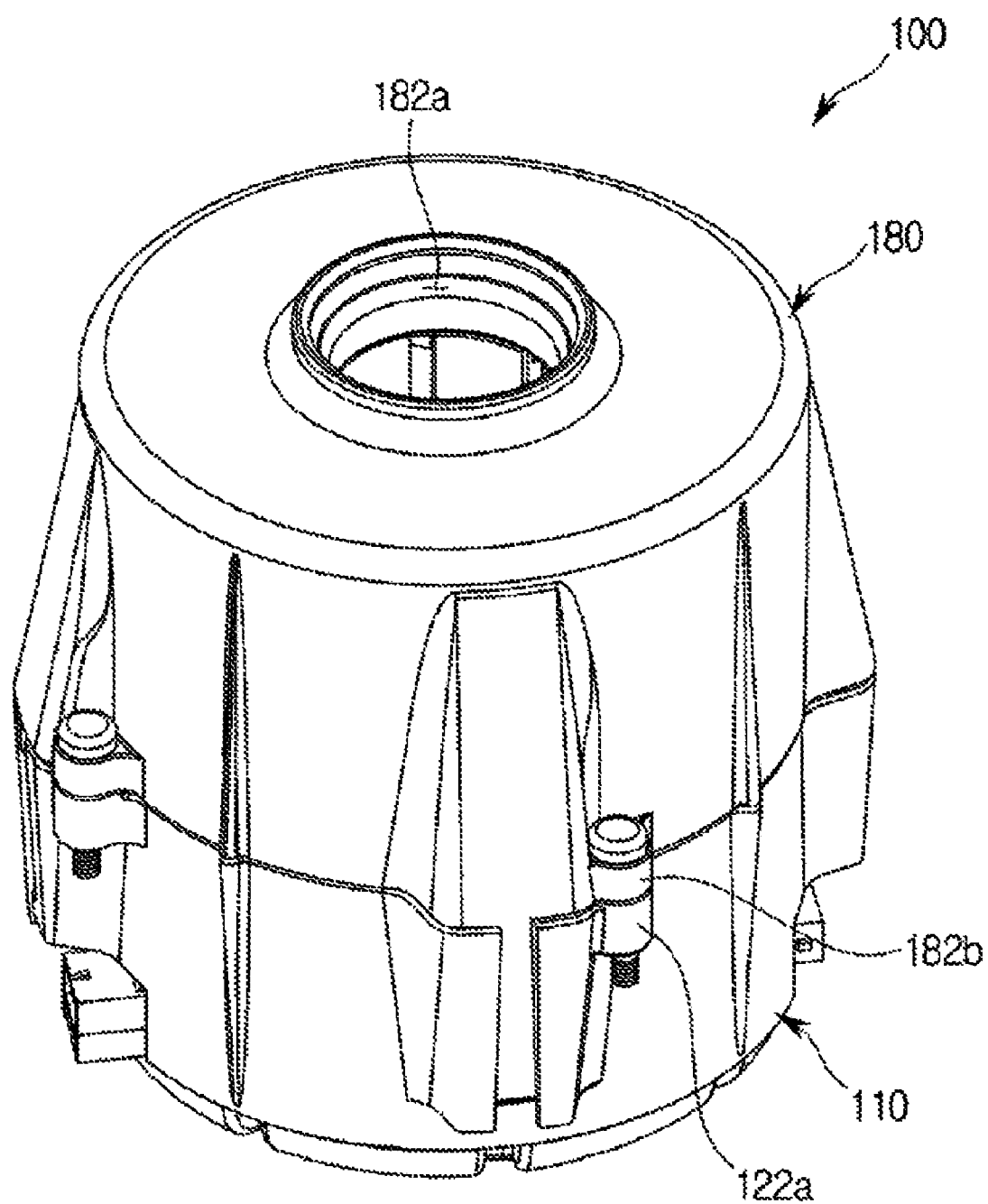
FIG. 1 is a perspective view of a motor in accordance with an embodiment of the present disclosure.

Reference will now be made in detail to the embodiments of the present disclosure, examples of which are illustrated in the accompanying drawings, wherein like reference numerals refer to like elements throughout.

Figure 2:
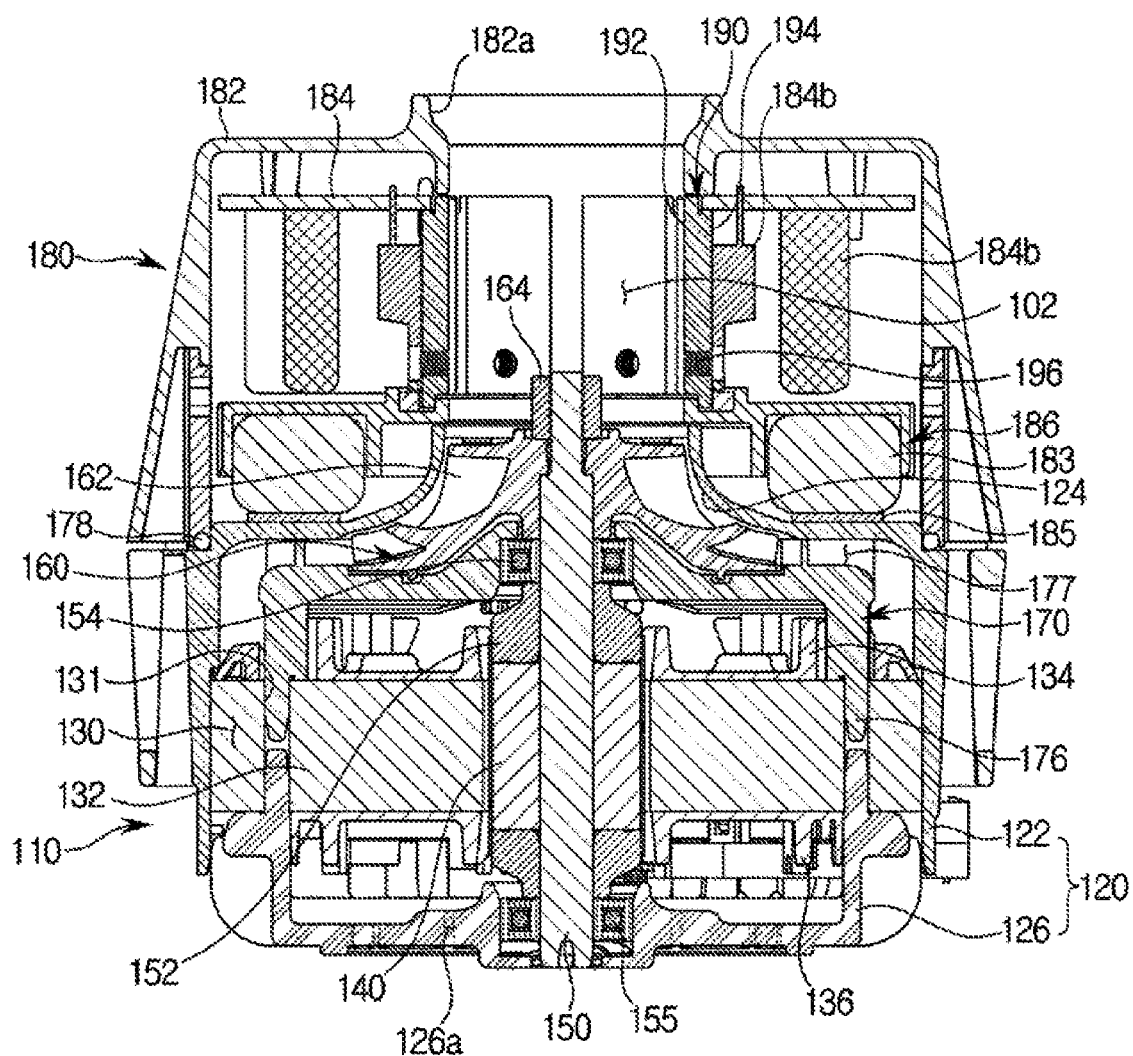
FIG. 2 is a cross-sectional view of the motor in accordance with an embodiment of the present disclosure.
Figure 3:
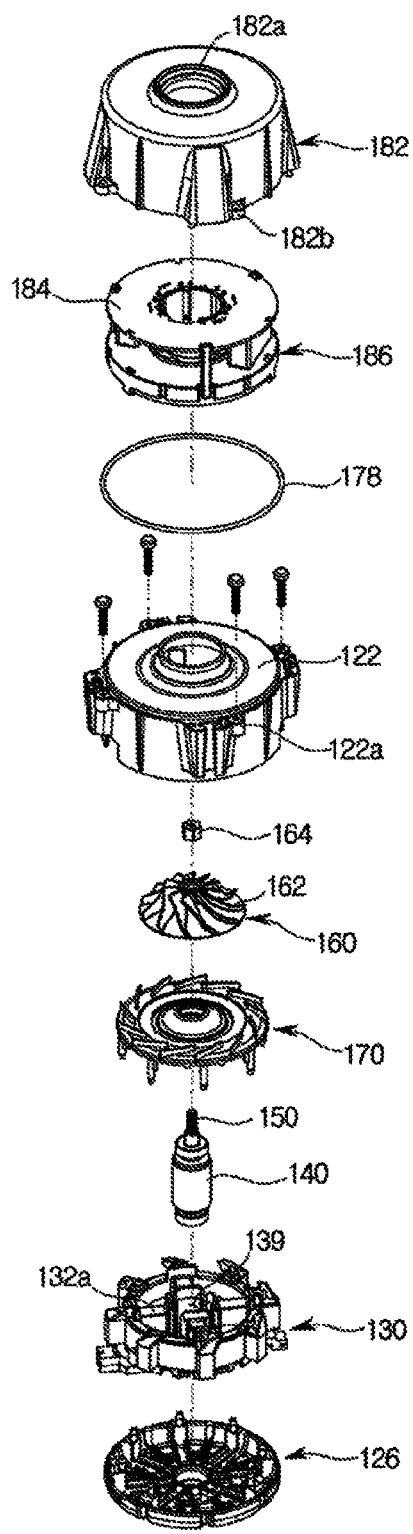
FIG. 3 and FIG. 4 are exploded views of the motor in accordance with an embodiment of the present disclosure.
Figure 4:
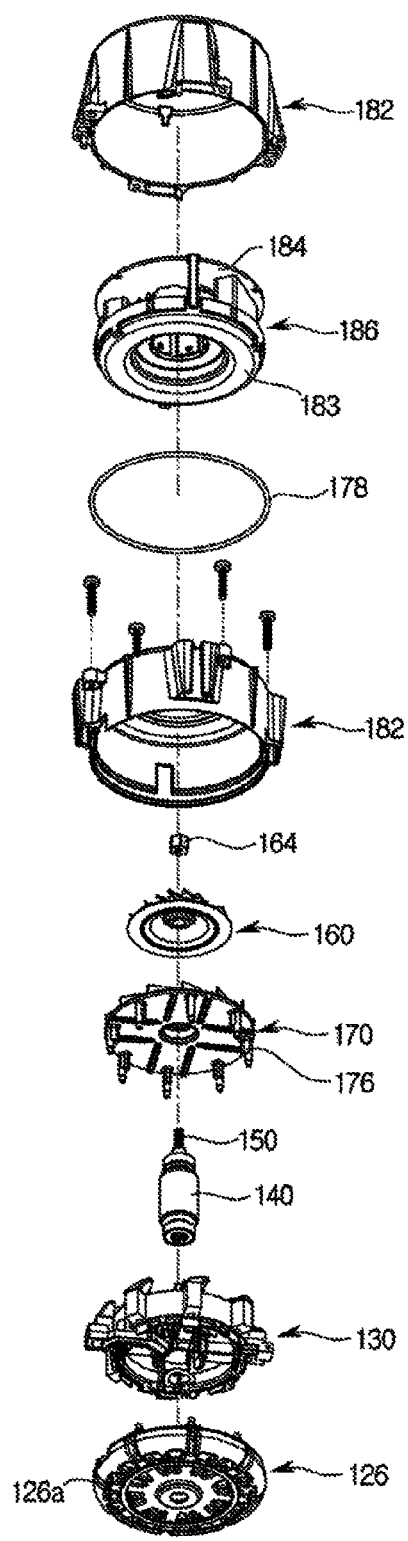

FIG. 1 is a perspective view of a motor in accordance with an embodiment of the present disclosure, FIG. 2 is a cross-sectional view of the motor in accordance with an embodiment of the present disclosure, and FIG. 3 and FIG. 4 are exploded views of the motor in accordance with an embodiment of the present disclosure.

A motor 100 may include a motor part assembly 110 and a control part assembly 180.

The motor part assembly 110 may include a housing 120.

The housing 120 may include an upper housing 122 provided at an upper portion and a lower housing 126 coupled to the upper housing 122 and provided at a lower portion. The housing 120 is provided to form an exterior appearance of the motor part assembly 110. The upper housing 122 and the lower housing 126 may be detachably provided toward an axial direction of a motor shaft 150. The upper housing 122 and the lower housing 126 may be coupled to and affixed to a stator 130 to be described later.

The upper housing 122 may include a shroud 124.

The shroud 124 is provided to correspond to an impeller 160 or a diffuser unit 174, and is configured to guide air being introduced to the motor 100. The shroud 124 is formed such that a cross section thereof is further narrowed toward an axial direction of the motor shaft 150 while being farther away from the motor shaft 150, and the cross section thereof may be provided to communicate with an air flow path 102. That is, the air being introduced through an air inlet 182a flows along the air flow path 102, and is exhausted through an air outlet 126a.

The air outlet 126a is provided at the lower housing 126, and is provided such that the air being introduced from the air inlet 182a provided at the control part housing 182, which is to be described later, may be exhausted. The lower housing 126 is provided to be coupled to the stator 130 which is to be described later, and in detail, the lower housing 126, while having a housing protrusion 128 protruding toward a side of the stator 130, may be provided to be affixed to the stator 130 while inserted into an insertion hole 131 of the stator 130.

A mounting recess may be formed at an outer circumferential surface of the lower housing 126 such that an end portion of the upper housing 122 may be coupled. The mounting recess is concavely formed along the surroundings of the lower housing 126 at the outer circumferential surface of the lower housing 126, and is provided such that one end portion unit of the upper housing 122 formed in the shape of a circle may be coupled. As the one end portion of the upper housing 122 is coupled to the mounting recess, the upper housing 122 and the lower housing 126 are coupled to each other.

The stator 130 and a rotor 140 are disposed inside the housing 120. The stator 130 may be affixed to the housing 120. The rotor 140 is structured to be rotated while interacting with the stator 130 electromagnetically. The rotor 140 may be disposed inside the stator 130.

The motor shaft 150 is inserted into a central portion of the rotor 140 to be rotated together with the rotor 140. One side of the motor shaft 150 is rotatably supported at a diffuser unit 170, which is to be described later, through a first bearing 154, and the other side of the motor shaft 150 may be rotatably supported at the lower housing 126 through a second bearing 155.

The stator 130 may include a stator body 132, a first insulator 134, a second insulator 136, and a coil.

A rotor accommodation part 139 configured to accommodate the rotor 140 is formed at a central unit of the stator body 132. Stator cores 132a are disposed along a circumferential direction of the rotor 140 at the surroundings of the rotor accommodation part 139. The stator cores 132a are extended in a radial shape from the rotor accommodation part 139. The stator body 132 may be formed by accumulating press-processed metallic panels.

A balancer 152 may be provided at the motor shaft 150. The balancer 152 is configured to prevent rotations of the motor shaft 150 by eccentric force by offsetting eccentricity of the motor shaft 150. The balancer 152 is provided at the motor shaft 150 toward a vertical direction of the rotor 150, and may be provided in a pair to prevent eccentric rotations of the rotor 140.

Through the structure as such, by providing an equivalent mass at upper and lower side of the motor shaft 150 while having the rotor 140 as a center, the rotations of the motor shaft 150 and the rotor 140 by eccentric force may be prevented. However, methods of preventing the motor shaft 150 and the rotor 140 from being rotated by eccentric force may not be limited hereto, and various methods may be applied.

The motor part assembly 110 may include the impeller 160 and the diffuser unit 170.

The impeller 160 is provided to be rotated together with the motor shaft 150. The impeller 160 is provided such that the rotational radius of a plurality of wings 162 of the impeller 160 is reduced along the direction further from the rotor 140, and is provided to exhaust the air, which is being introduced toward a side of the motor shaft 150 according to the rotations of the impeller 160, toward a radial direction of the motor shaft 150. A fixing screw 164 configured to fix the impeller 160 and provided such that the impeller 160 is not separated. An embodiment of the impeller 160 is described as above, and the shape and disposition of the impeller 160 are not limited hereto, and any structure provided to flow air may be satisfactory.

The diffuser unit 170 is provided to increase velocity of the air that flows by use of the impeller 160, and is provided to be disposed at an outer side along a radial direction of the impeller 160.

The diffuser unit 170 may include a unit body 172, a diffuser unit 174, and an assembly protrusion 176.

The unit body 172, while coupled to the motor shaft 150 by use of the first bearing 154, may be fixedly provided regardless of rotations of the motor shaft 150, and is provided to have a predetermined gap with respect to a lower portion of the impeller 160. In other words, the diffuser unit 170 affixed to the stator 130 may be able to rotatably support the motor shaft 150 by use of the first bearing 154.

The diffuser unit 174 may be provided toward a direction of a radial shape with respect to the unit body 172. In detail, the diffuser 174 may be formed toward a direction being extended with respect to the plurality of wings 162 of the impeller 160. The diffuser unit 174 may be formed with a plurality of ribs 174a, and the plurality of ribs 174a may be formed such that the gap with respect to the each of the plurality of ribs 174 may be widened along the direction being extended with respect to the plurality of winds 162. The plurality of ribs 174a is formed to increase the velocity of air while guiding the air that flows by use of the impeller 160. In detail, a diffuser flow path 177 is formed by use of the plurality of ribs 174a forming the diffuser unit 174 and the shroud 124 formed at the upper housing 122, and is formed to increase the velocity of air while guiding the air that flows by use of the impeller 160.

The assembly protrusion 176 protrudes from the unit body 172, and is provided such that the diffuser unit 170 is affixed to the stator 130. The assembly protrusion 176 is provided in a plurality of units, and the plurality of assembly protrusions 176 is provided to be disposed along an outer side of the unit body 172 toward a circumferential direction while spaced apart from each other. As the plurality of assembly protrusions 176 is disposed toward a circumferential direction while spaced apart from each other, the plurality of assembly protrusions 176 is provided to support the diffuser unit 170, the motor shaft 150, and the rotor 140 not to be provided with eccentricity with respect to a central portion of the stator 140. The assembly protrusion 176 in an embodiment of the present disclosure is provided with a total of four units, and the four units of the assembly protrusion 176 are supported at the stator 130. However, the number of the assembly protrusion 176 is not limited hereto.

The plurality of assembly protrusions 176 is inserted into the plurality of insertion holes 131 formed at the stator 130 so that the diffuser unit 170 is affixed to the stator 130, and the plurality of insertion holes 131 is provided to be disposed while corresponding with respect to the plurality of assembly protrusions 176. The insertion hole 131 is provided to vertically penetrate the stator 130, and the plurality of assembly protrusions 176 and the housing protrusion 128 provided at the lower housing 126 may be provided to face each other.

The diffuser unit 170 is provided with metallic material having high heat conductivity, and may improve heat radiation efficiency. The diffuser unit 170 may be provided with aluminum material, for example.

The control part assembly 180 is provided to control the motor part assembly 110. The control part assembly 180 may be provided to be disposed at a side of the motor part assembly 110.

The control part assembly 180 may include a control part housing 182, and a printed circuit board 184 provided inside the control part housing 182.

The control part housing 182 is provided to protect the component, such as the printed circuit board 184 or an inductor 183, that is disposed at an inside the control part housing 182, and the air inlet 182a through which outside air is inlet may be provided at the control part housing 182. The air inlet 182a is provided to communicate with respect to the air flow path 102.

The disposition of the air inlet 182a is not limited hereto, but in an embodiment of the present disclosure, the control part housing 182 is coupled to an upper portion of the motor part assembly 110, and the air inlet 182a is provided to be disposed at a direction being extended toward an axial direction of the motor shaft 150.

The printed circuit board 184, while provided inside the control part housing 182, may be provided not to be exposed to an outside. The printed circuit board 184 may be provided to be affixed to an upper portion of an inner side of the control part housing 182.

An electronic element 184b may be embedded in the printed circuit board 184 to control the motor part assembly 110. The printed circuit board 184 may be provided with a penetration hole 184a configured to penetrate an upper surface and a lower surface of the printed circuit board 184 while corresponding to the air inlet 182a. The shape of the printed circuit board 184 is not limited hereto, but printed circuit board 184 may be provided to have the shape of a ring while having the penetration hole 184a as a center. The printed circuit board 184 may be press-fitted into and affixed to an inner side surface 192 of the control part housing 182.

The control part assembly 180 may include a heat sink 190.

The heat sink 190, by radiating the heat being generated from the control part assembly 180, is configured to improve stability of a product, and enables the motor 100 to stably drive.

The heat sink 190 may be formed at the printed circuit board 184. In detail, the heat sink 190 may be formed along a circumferential direction while having the penetration hole 184a of the printed circuit board 184. The heat sink 190 is provided in plurality of units, and the plurality of heat sinks 190 is provided to be spaced apart at a predetermined distance with respect to each other while reciprocally disposed along a circumferential direction.

The air flow path 102 through which the air being introduced from the air inlet 182a by use of the heat sink 190 may be formed. As an end portion of the heat sink 190 and an end portion of the shroud 124 are provided to be coupled to each other, the air that flows through the air flow path 102 may be exhausted to the air outlet 126a along the inner side surface 192 of the shroud 124.

The control part assembly 180 may include the inductor 183.

The inductor 183 is provided to be disposed inside the control part housing 182, and is used to reduce rapid changes of current flows. In a case when the change of current is rapid, a large amount of heat is generated at the electronic element 184b, and by reducing the range of the change as such, the amount of heat itself may reduced.

The inductor 183 is disposed to face the printed circuit board 184 formed in the shape of a ring, and may be provided to couple to an inductor mounting part 186. The inductor mounting part 186 may include a plurality of leg parts 188 formed along a circumferential direction to be affixed to the inductor mounting part 186 while spaced apart with respect to each other, and a mounting groove 187 concavely formed in the shape of a ring such that the inductor may be coupled. The inductor 183 is formed in the shape of a ring, and thus the mounting groove 187 at which the inductor 183 is coupled as well is formed in the shape of a ring, and a hollow part 187a may be provided at a central portion of the mounting groove 187 such that the air flow path 102 may pass through.

At an end portion of the each of the plurality of leg parts 188, an expansion leg part 188a is formed to expand a cross section of the end portion of the each of the plurality of leg parts 188. The expansion leg part 188a is hooked at a hooking groove 184c of the printed circuit board 184. The shape at which the inductor mounting part 186 is affixed to the printed circuit board 184 is not limited hereto, and the shape may be of a protrusion or a groove, so that the inductor 183 and the inductor 186 may be coupled through an insertion-coupling process.

The inductor 183 is coupled to the inductor mounting part 186 and the inductor mounting part 186 is coupled to the printed circuit board 184. In addition, the printed circuit board 184 may be provided to be press-fitted into and affixed to the inner side surface 192 of the control part housing 182, and thus the control part assembly 180 may be assembled as a single module.

As the motor part assembly 110 and the control part assembly 180 are assembled, the inductor 183 is disposed at an upper surface of the upper housing 122, and a pad part 185 may be provided between the inductor 183 and the upper housing 122 to prevent noise caused by vibration and trembling that may be generated by a gap between the structures thereof. The pad part 185 is provided between the inductor 183 and the upper housing 122, thereby reducing the gap between the two structures thereof, and may be formed with insulation material not to electrically influence each other.

The motor part assembly 110 and the control part assembly 180 may be coupled to each other through a screw coupling.

In detail, by screw-coupling a motor part coupling part 122a provided at an outer side of the upper housing 122 of the motor part assembly 110 and a control part coupling part 182b provided at an outer surface of the control part housing 182, the motor part assembly 110 and the control part assembly 180 may be coupled. The motor part coupling part 122a and the control part coupling part 182a are formed at outer surfaces of the upper housing 122 and the control part housing 182, respectively, while the motor part coupling part 122a and the control part coupling part 182a each is provided in a plurality of units, and the motor part coupling part 122a and the control part coupling part 182a may be disposed along circumferential direction of the upper housing 122 and the control part housing 182 while spaced apart at a predetermined distance.

At the time of the motor part assembly 110 and the control part assembly 180 are coupled, an o-ring 178 in the shape of a ring may be provided at an upper surface of the upper housing 122. That is, at a portion at which an upper surface of the upper housing 122 and the inner side surface 192 of the control part housing 182 are in contact, the o-ring 178 is disposed, so that moisture or dust may be prevented from being introduced from an outside to an inside of the motor. The o-ring 178 may be provided with material having elasticity.

As the above, by dividing the motor by use of the motor part assembly 110 and the control part assembly 180, the motor part assembly 110 and the control part assembly 180 each may be assembled as a single module, so that in case one of the motor part assembly 110 or the control part assembly 180 fails, the motor need not be entirely disassembled to replace a portion of the structure, and thus is effective in the aspects of maintenance and repair.

Figure 5:
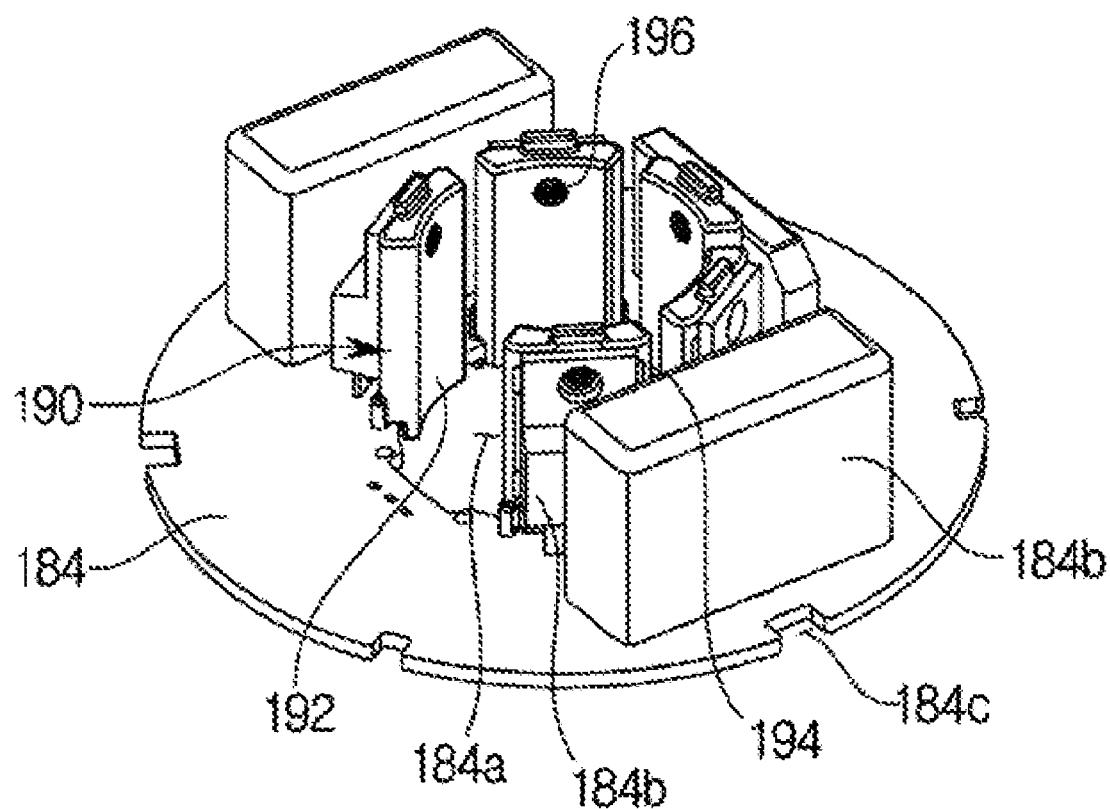
FIG. 5 and FIG. 6 are drawings of a heat sink and a printed circuit board in accordance with an embodiment of the present disclosure.
Figure 6:
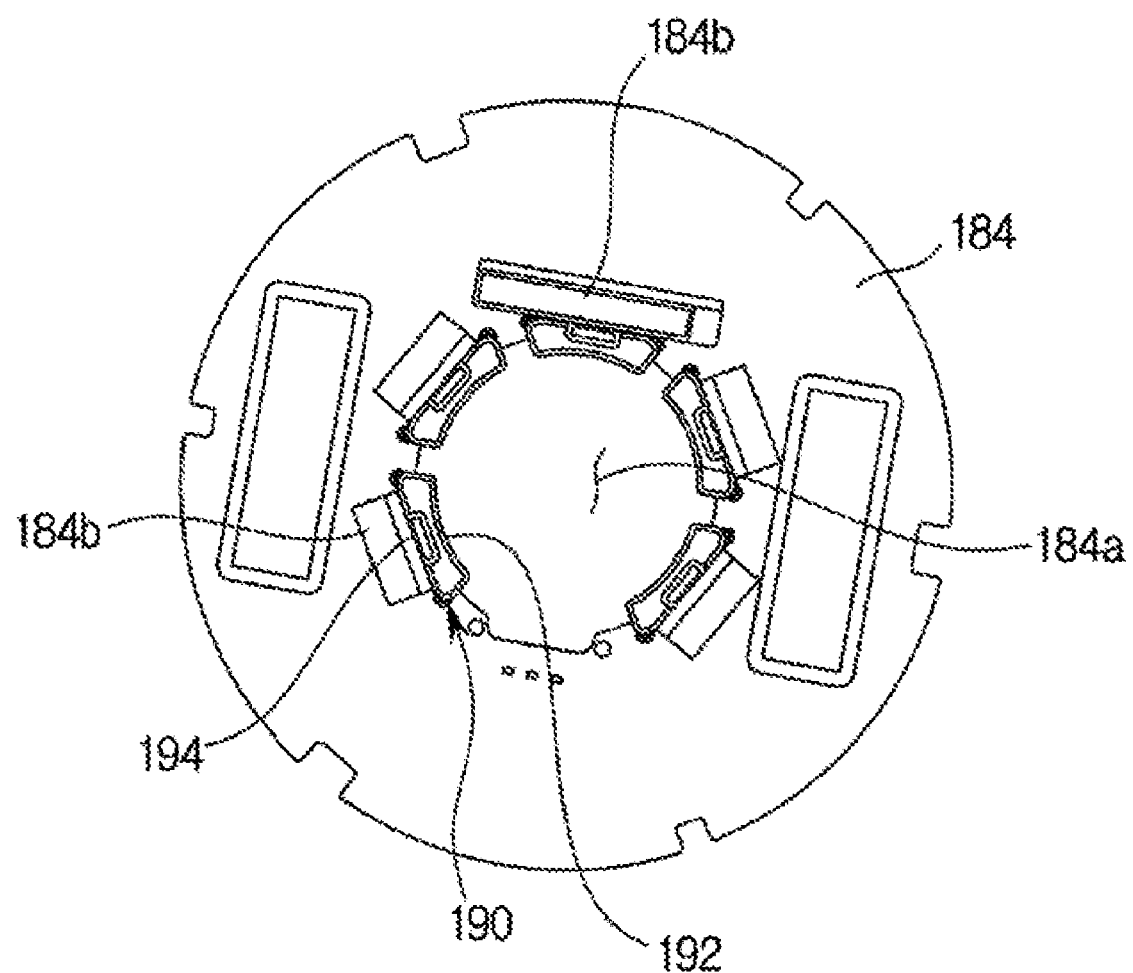

FIG. 5 and FIG. 6 are drawings of the heat sink and the printed circuit board in accordance with an embodiment of the present disclosure.

The heat sink 190, by radiating the heat being generated from the control part assembly 180, is configured to improve stability of a product, and enables the motor 100 to stably drive.

The heat sink 190 may be formed at the printed circuit board 184. In detail, the heat sink 190 may be formed along a circumferential direction of the penetration hole 184a of the printed circuit board 184. The heat sink 190 is provided in plurality of units, and the plurality of heat sinks 190 is provided to be spaced apart at a predetermined distance with respect to each other while reciprocally disposed along a circumferential direction. The predetermined distance is not limited, and the plurality of heat sinks 190 may have a distance of approximately 3 mm with respect to each other.

The air flow path 102 may be formed by having the inner side surface 192 of the heat sink 190 in the shape of a curved surface such that the air being introduced by use of the air inlet 182a of the control part housing 182 is guided. That is, as the plurality of heat sinks 190 is evenly disposed toward a circumferential direction along the penetration hole 184a, the inner side surface 192 of the heat sink 190 is provided to form the air flow path 102 having a cross section thereof formed in the shape of a circle.

Through the structure as such, by absorbing the heat from the printed circuit board 184 and the electronic element 184b embedded at the printed circuit board 184, as well as from inside the control part housing 182, the heat is provided to be exhausted by the air that flows along the air flow path 102.

An outer side surface 194 of the heat sink 190 may be formed in the shape of a planar surface. The outer side surface 194 of the heat sink 190 may be provided such that the electronic element 184b of the printed circuit board 184 may be attached at one side surface of the outer side surface 194 of the heat sink 190. That is, while provided to expand a contact area of the electronic element 184b, the heat being generated from the electronic element 184b is provided to be absorbed faster.

The plurality of heat sinks 190 may be disposed along the penetration hole 184a of the printed circuit board 184. However, in an embodiment of the present disclosure, an auxiliary flow path forming part 189 having a portion thereof is disposed to be empty while the space of the portion protrudes from the inductor mounting part 186 may be inserted. The air flow path 102 may be formed by the each inner side surface 192 of the plurality of heat sinks 190 and the inner side surface 192 of the auxiliary flow path forming part 189. However, the disclosure is not limited hereto, and only the plurality of heat sinks 190 may be disposed along the penetration hole 184a. The number of units and the dispositions of the heat sinks 190 are not limited hereto, and may be changed according to the size of the printed circuit board 184 or the status of the disposition of the electronic element 184b.

The heat sink 190 may include a coupling protrusion 195 provided at one end portion of the heat sink 190 to have the heat sink 190 coupled to the printed circuit board 184. The heat sink 190 may be supported at the printed circuit board 184 as the coupling protrusion 195 is inserted into the printed circuit board 184. The coupling protrusion 195 is provided at least one unit thereof in the shape of a pin, and may be inserted into the printed circuit board 184.

The heat sink 190 may further include an element coupling hole 196 configured to penetrate the inner side surface 192 and the outer side surface 194 of the heat sink 190 to be rivet-coupled to the electronic element 184b. As the heat sink 190 is rivet-coupled to the electronic element 184b through the element coupling hole 196, the electronic element 184b may be fixed. However, the method of coupling the electronic element 184b to the heat sink 190 is not limited hereto, and any method provided to have the electronic element 184b attached at the outer side surface 194 of the heat sink 190 may be satisfactory.

Hereinafter, assembly processes of a motor in accordance with an embodiment of the present disclosure will be described.

First, an assembly process of the motor part assembly 110 will be described.

Figure 7:
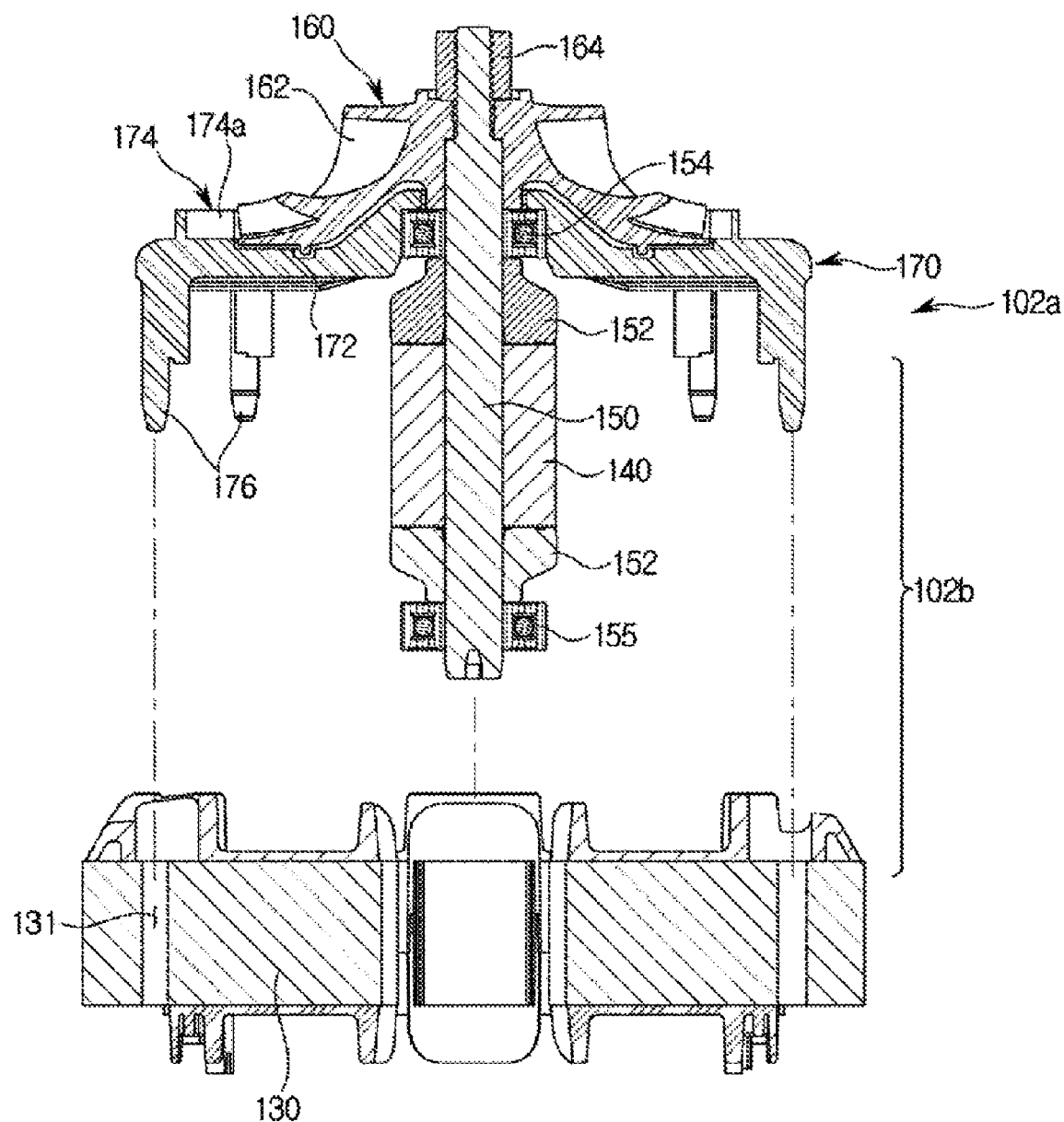
FIG. 7, FIG. 8, and FIG. 9 are drawings of an assembly of a motor part assembly in accordance with an embodiment of the present disclosure.
Figure 8:
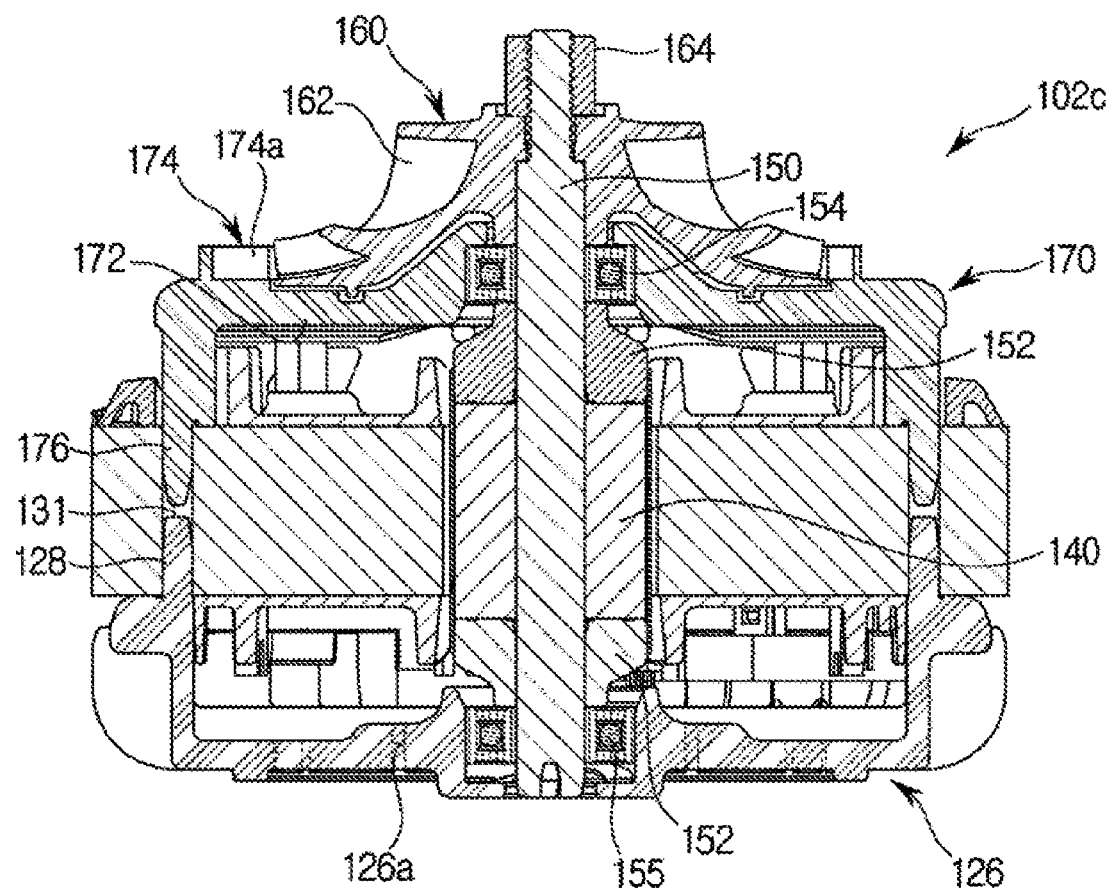
Figure 9:
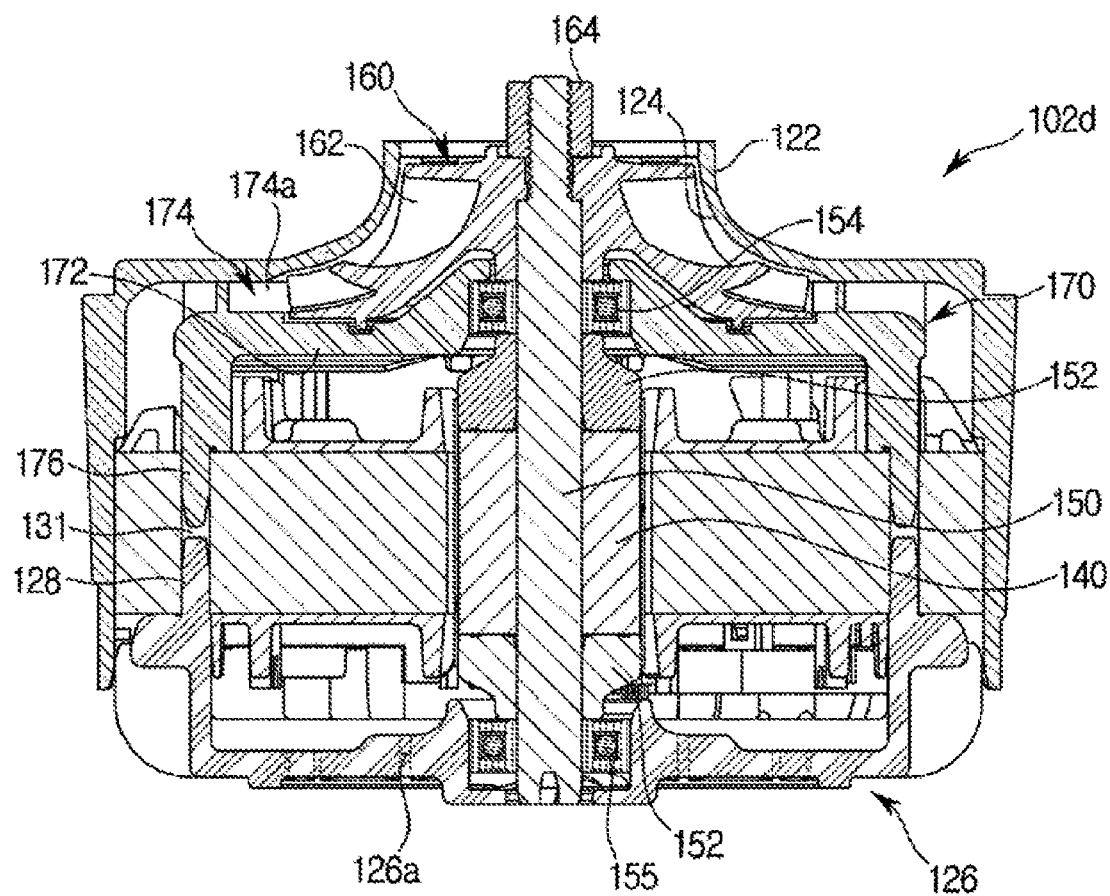

FIG. 7, FIG. 8, and FIG. 9 are drawings of an assembly of the motor part assembly in accordance with an embodiment of the present disclosure.

As illustrated on FIG. 7, a first motor assembly segment 102a is formed by coupling the first bearing unit 154 and the diffuser unit 170. In addition, the impeller 160 is coupled to be rotated together with the motor shaft 150. The portion adjacent to the motor shaft 150 of the impeller 160 is provided to be in contact with the first bearing unit 154, and a lower portion of the impeller 160 is provided to form a predetermined gap with an upper portion of the unit body 172. The rotor 140 is disposed at the motor shaft 150, and is provided such that the motor shaft 150 is rotated while interacting with the stator 130 electromagnetically. The balancer 152 is provided at the motor shaft 150, and is provided to compensate eccentricity of the motor shaft 150.

Next, as illustrated on FIG. 7, a second motor assembly segment 102b is formed by coupling the diffuser unit 170 and the stator 130.

The plurality of assembly protrusions 176 of the diffuser unit 170 is inserted into the plurality of insertion holes 131 of the stator 130. As the plurality of assembly protrusions 176 is inserted into the plurality of insertion holes 131, the central portion of the stator 130 and the axial direction of the motor shaft 150 disposed at a central portion of the diffuser unit 170 may be disposed without having eccentricity. That is, the plurality of assembly protrusions 176 is disposed along a circumferential direction while spaced apart with respect to each other, and as the motor shaft 150 is disposed at a center portion thereof, the plurality of assembly protrusions 176 is inserted into the plurality of insertion holes 131, and thereby the axial direction of the motor shaft 150 and the central portion of the stator 130 are not provided with eccentricity.

Next, as illustrated on FIG. 8, a third motor assembly segment 102c is formed by coupling the lower housing 126 and the second motor assembly segment 102b.

The plurality of housing protrusions 128 of the lower housing 126 is inserted into the insertion holes 131 of the stator 130, and thus the lower housing 126 is coupled to the second motor part assembly 102b.

Next, as illustrated on FIG. 9, a fourth motor part assembly 102d is formed by coupling the upper housing 122 into the third motor part assembly 102c.

As one end portion of the upper housing 122 is coupled to the mounting recess 129 of the lower housing 126, the upper housing 122 is coupled to the third motor part assembly 102c.

Through the assembly processes as such the motor part assembly 110 is assembled.

Next, assembly methods of the control part assembly 180 will be described.

Figure 10:
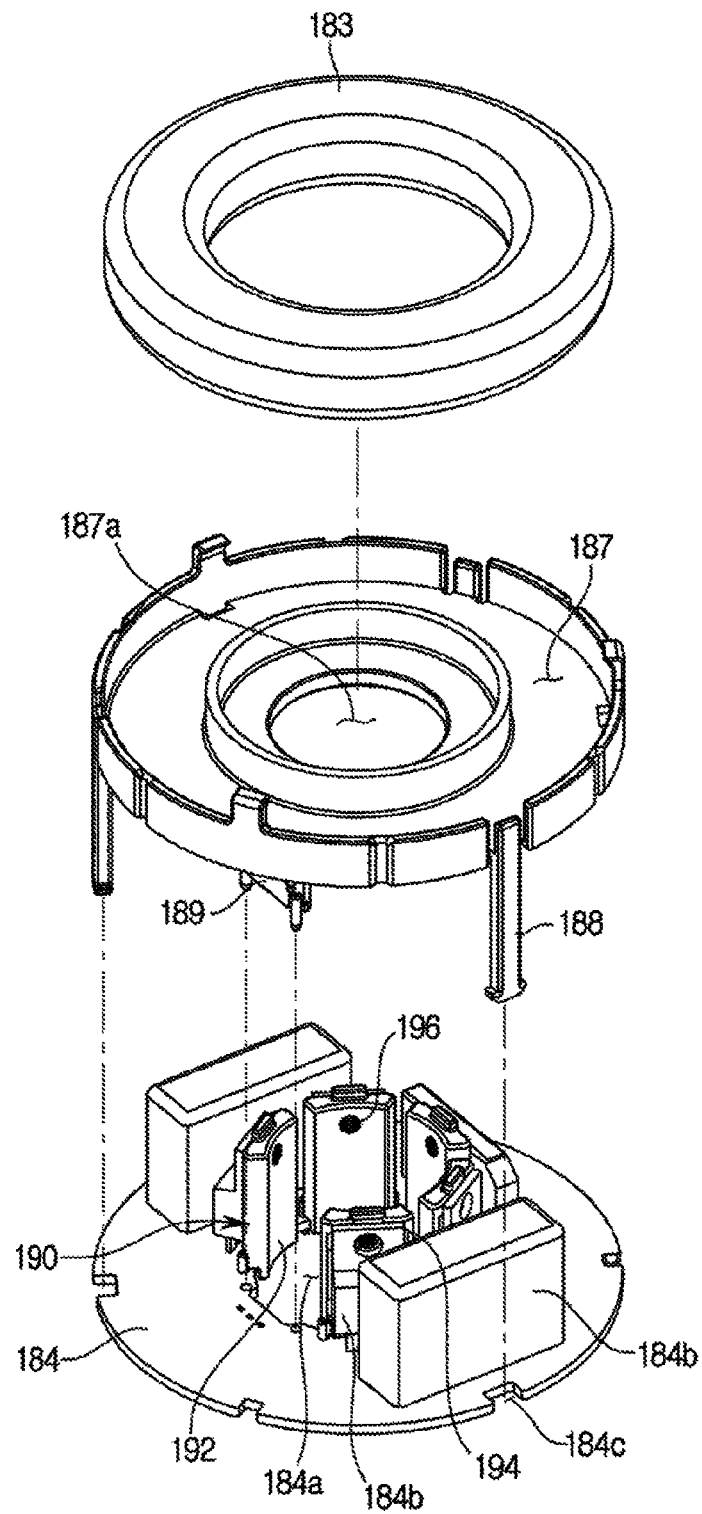
FIG. 10 is an exploded view of a portion of a structure of a control part assembly in accordance with an embodiment of the present disclosure.
Figure 11:
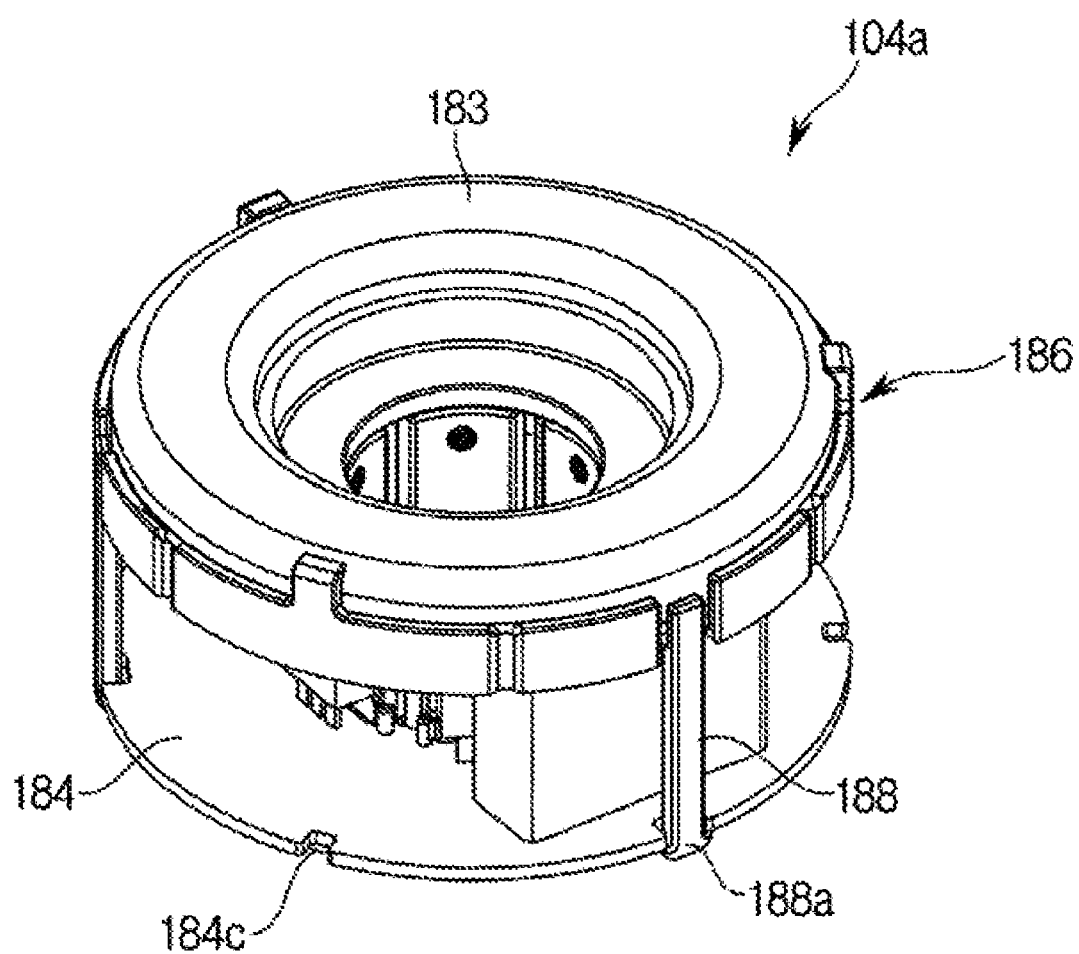
FIG. 11 and FIG. 12 are drawings of an assembly of the control part assembly in accordance with an embodiment of the present disclosure.
Figure 12:
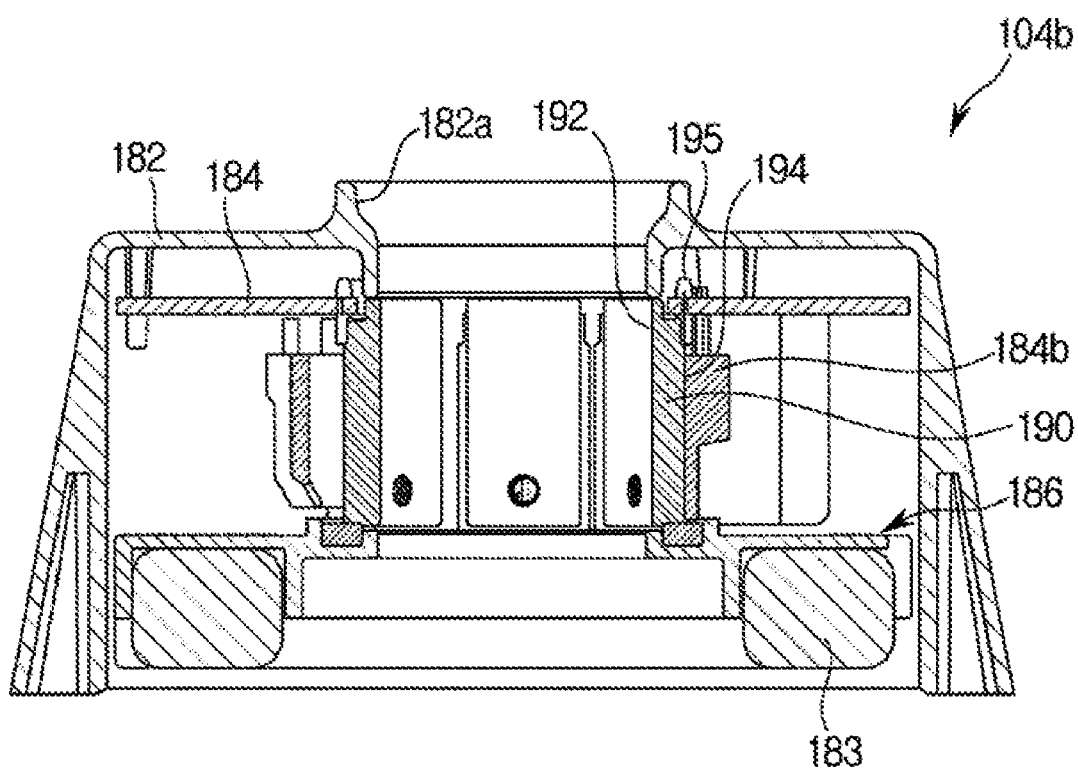

FIG. 10 is an exploded view of a portion of a structure of the control part assembly in accordance with an embodiment of the present disclosure, and FIG. 11 and FIG. 12 are drawings of an assembly of the control part assembly in accordance with an embodiment of the present disclosure.

As illustrated on FIG. 10 and FIG. 11, a first control part assembly 104a is formed by mounting the inductor mounting part 186 and the inductor 183 at the printed circuit board 184.

The inductor 183 is coupled to the mounting groove 187 formed in the shape of a ring at the inductor mounting part 186. The plurality of leg parts 188 of the inductor mounting part 186 are disposed in a circumferential direction along the body of the inductor mounting part 186 while spaced apart from each other, and are affixed to the printed circuit board 184. In detail, the expansion leg part 188a is provided to be hooked to the printed circuit board 184, and the inductor mounting part 186 is fixed.

As illustrated on FIG. 12, a second control part assembly 104b is formed by coupling the first control part assembly 104a into the control part housing 182.

The printed circuit board 184 of the first control part assembly 104a may be press-fitted into and affixed to the inner side surface 192 of the control part housing 182. The first control part assembly 104a is in a coupled state, and thus by fixing the printed circuit board 184 at the control part housing 182, the control part housing 182 and the first control part assembly 104a may be coupled to each other.

However, regardless of the assembly process, the printed circuit board 184 may be coupled to the control part housing 182 first, and then the inductor 183 and the inductor mounting part 186 may be coupled to the printed circuit board 184. When the control part assembly 180 is assembled as a single module, the above assembly processes are satisfied.

Through the assembly processes as such, the control part assembly 180 is assembled.

The motor part assembly 110 and the control part assembly 180 being assembled as the above methods may be disposed as each independent module, and the motor is provided as the motor part assembly 110 and the control part assembly 180 are coupled to each other.

Hereinafter, a motor in accordance with an embodiment of the present disclosure will be described.

The descriptions of the structures that are overlapped with the above descriptions will be omitted.

Figure 13:
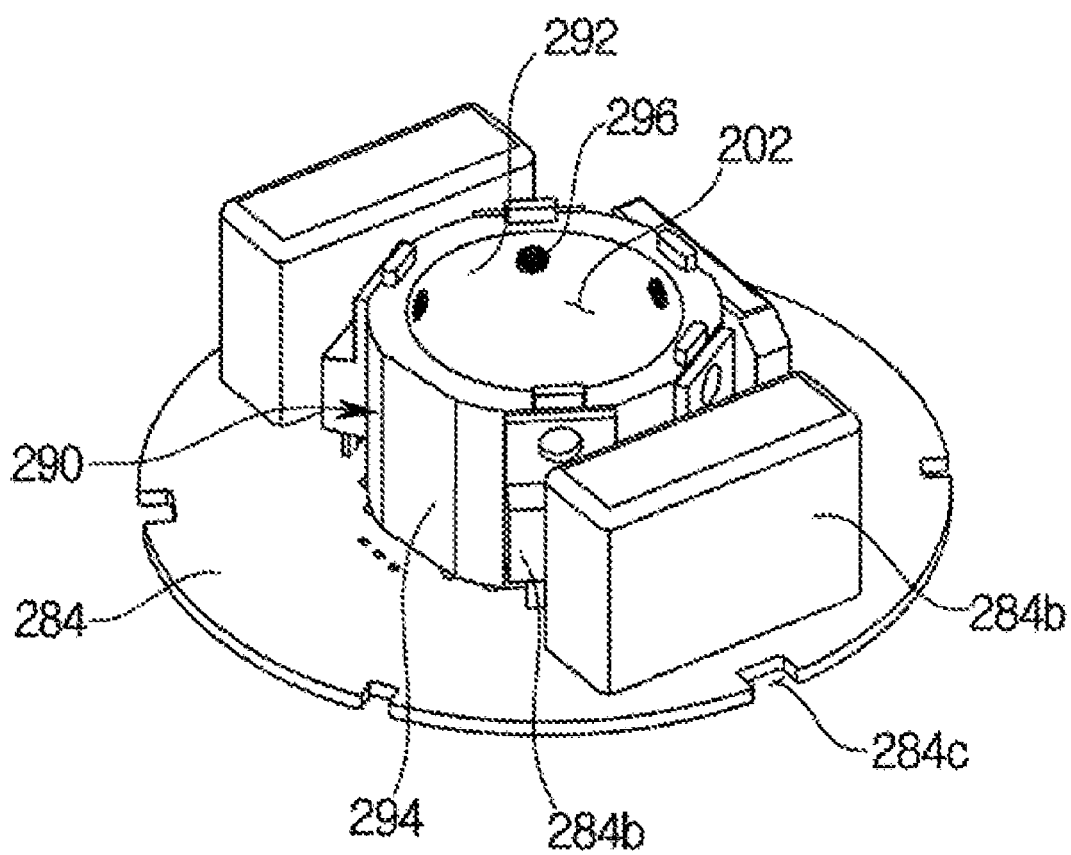
FIG. 13 is a perspective view of a heat sink in accordance with an embodiment of the present disclosure.
Figure 14:
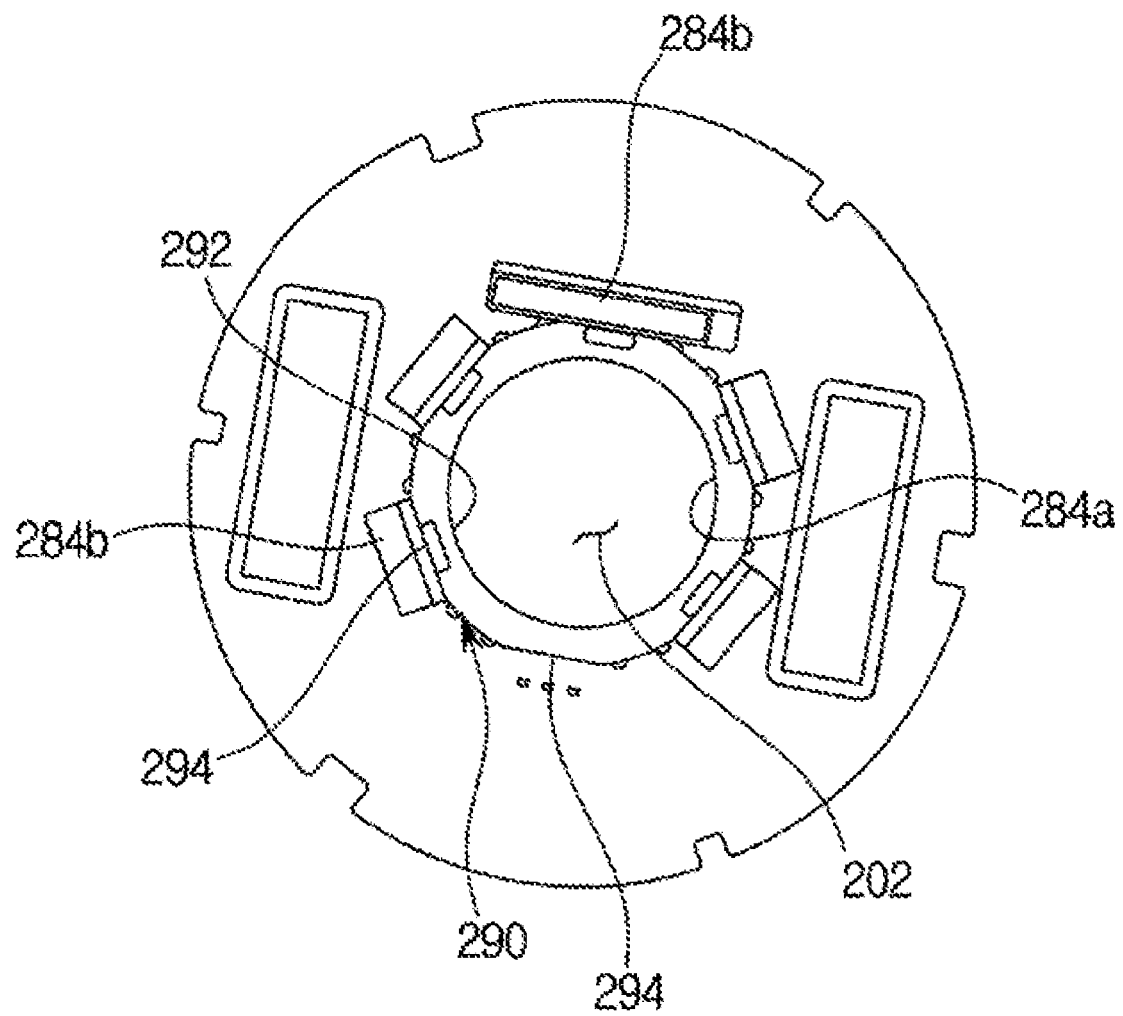
FIG. 14 is an upper surface view of a heat sink in accordance with an embodiment of the present disclosure.

FIG. 13 is a perspective view of the heat sink in accordance with an embodiment of the present disclosure, and FIG. 14 is an upper surface view of the heat sink in accordance with an embodiment of the present disclosure.

The heat sink 290 may be formed on a printed circuit board 284. In detail, the heat sink 290 may be formed along a circumferential direction of a penetration hole 284a of the printed circuit board 284.

The heat sink 290 is provided with an inner side surface 292 thereof formed in the shape of a curve, and may be able to form an air flow path 202 to guide the air being introduced by use of an air inlet 182a of a control part housing 181. That is, as a cross section of the inner side surface 292 is formed in the shape of a ring or a circle, the air flow path 202 is provided to be formed along an inner side thereof.

Through the structure as such, by absorbing the heat of the printed circuit board 284, an electronic element 284b embedded in the printed circuit board 284, and inside the control part housing 182, the heat is provided to be radiated by the air that flows along the air flow path 202.

An outer side surface 294 of the heat sink 290 may be provided such that a plurality of plane surface is disposed. That is, a cross section of the outer side surface 294 of the heat sink 290 may be formed in the approximate shape of a polygon. Through the structure as such, a contact surface with respect to the electronic element 284b is provided to be widened, such that the heat being generated from the electronic element 284b may be absorbed faster.

In an embodiment of the present disclosure, the number of planar surfaces (sides) of the heat sink 290 is provided to be six units, but the number and the dispositions of the plane surface are not limited hereto, and the number and the dispositions of the plane surface may be changed according to the size of the printed circuit board 284 or the status of the disposition of the electronic element 284b.

A hooking groove 284c and an element coupling hole 296 that are not described are identical to the descriptions above.

Hereinafter, a motor in accordance with an embodiment of the present disclosure will be described.

The descriptions of the structures that are overlapped with the above descriptions will be omitted.

Figure 15:
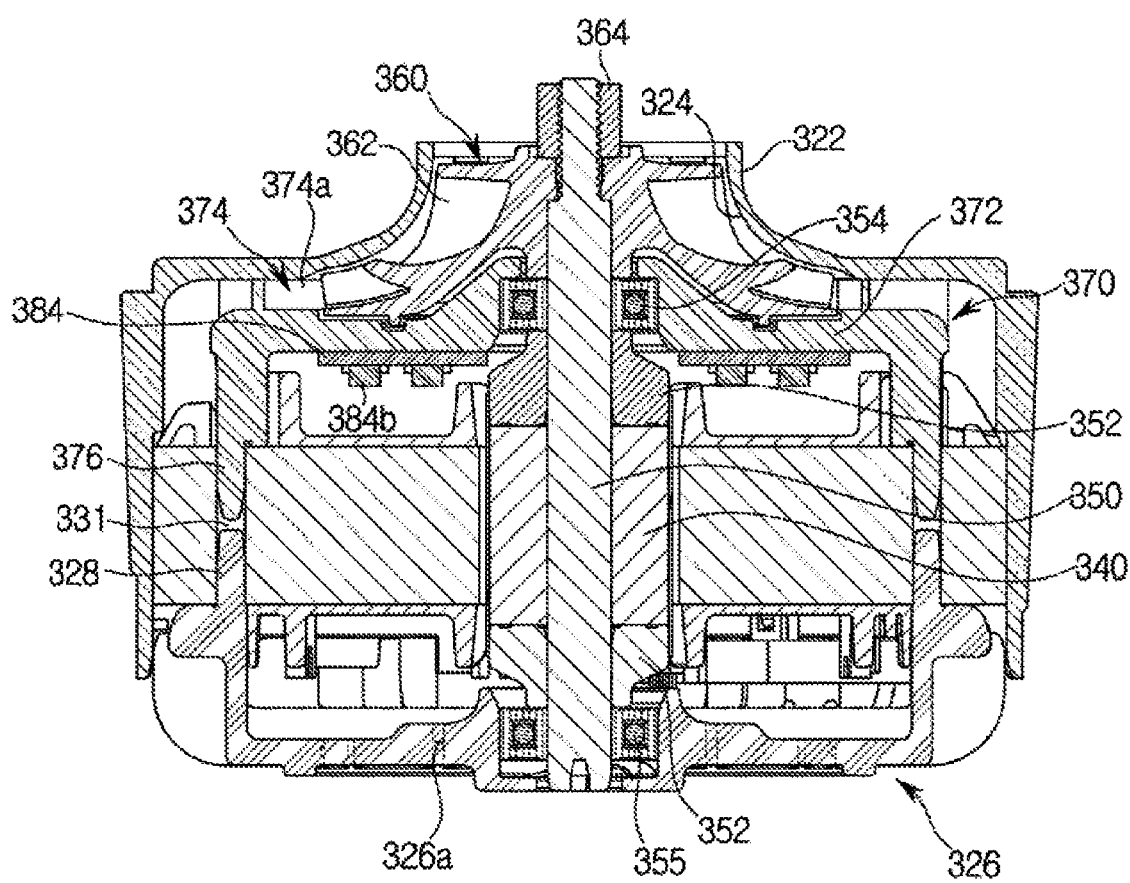
FIG. 15 is a cross-sectional view of a motor part assembly in accordance with an embodiment of the present disclosure.

FIG. 15 is a cross-sectional view of a motor part assembly in accordance with an embodiment of the present disclosure.

In an embodiment, the printed circuit board 184 may be provided to be disposed at a bottom surface of a diffuser unit 370. The diffuser unit 370 may be provided with metallic material having high heat radiation efficiency, and as the printed circuit board 384 is provided at the bottom surface of a unit body 372, the heat being generated at the printed circuit board 384 and an electronic element 384b may be radiated by use of the diffuser unit 370. In addition, the air that flows by use of an impeller 360 is exhausted to the outside of the motor through the diffuser unit 370, and thus the heat radiation efficiency of the printed circuit board 384 may be further improved.

An upper housing 322, a shroud 324, a lower housing 326, an air outlet 326a, a housing protrusion 328, an insertion hole 331, a rotor 340, a motor shaft 350, a balancer 352, a first bearing 354, a second bearing 355, the impeller 360, a plurality of wings 362, a fixing screw 364, a diffuser unit 374, a plurality of ribs 374a, an assembly protrusion 376, and the electronic element 384b that are not described are identical to the previous descriptions.

Hereinafter, a motor in accordance with an embodiment of the present disclosure will be described.

The descriptions of the structures that are overlapped with the above descriptions will be omitted.

Figure 16:
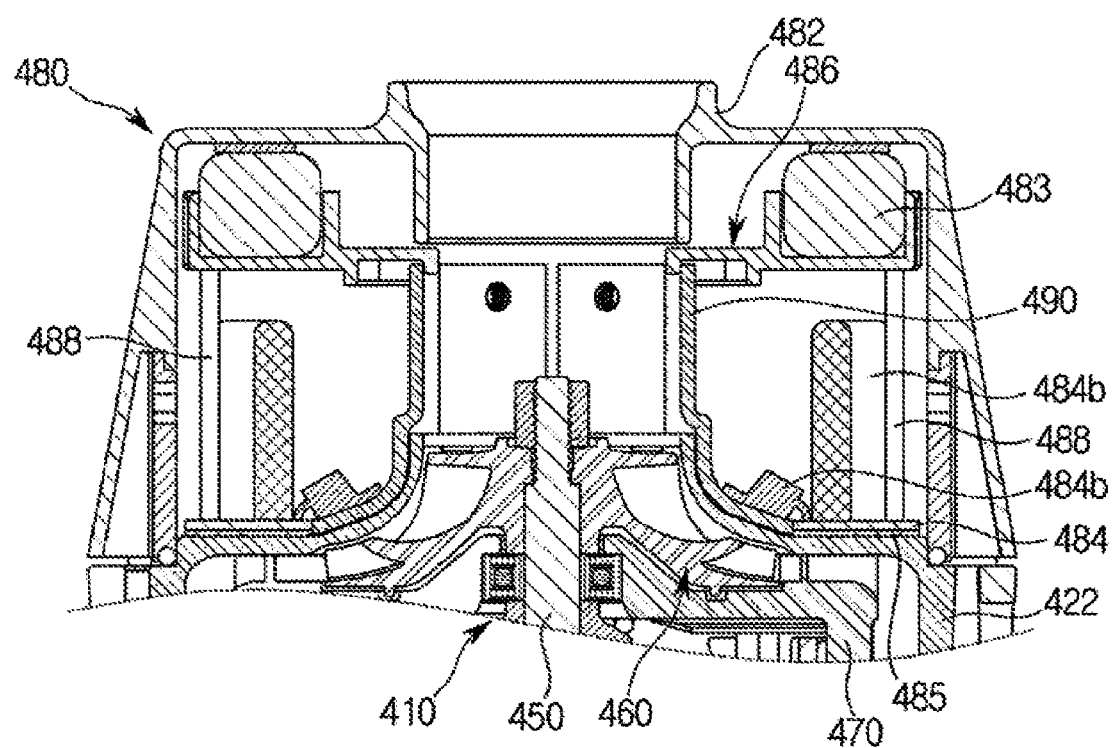
FIG. 16 is a cross-sectional view of a control part assembly in accordance with an embodiment of the present disclosure.

FIG. 16 is a cross-sectional view of the control part assembly in accordance with an embodiment of the present disclosure.

The control part assembly 480 may include a control part housing 482, and a printed circuit board 484 provided inside the control part housing 482.

The printed circuit board 484 is provided inside the control part housing 482, and may be provided not to be exposed to an outside. The printed circuit board 484 may be provided to be affixed to a lower portion of an inner side of the control part housing 482.

That is, an inductor 483 is disposed at an upper portion of an inner side of the control part housing 482, and as a plurality of leg parts 488 of an inductor mounting part 486, at which the inductor 483 is coupled, is configured to support the printed circuit board 484, and the printed circuit board 484 may be disposed at a lower portion of an inner side of the control part housing 482.

At the time of when a motor part assembly 410 and the control part assembly 480 are coupled, an adhering pad 485 is provided between the printed circuit board 484 and an upper housing 422 to improve heat conductivity. The adhering pad 485 may be formed with material having high heat conductivity.

Through the structure as such, the heat generated at the printed circuit board 484 is delivered to the upper housing 422 through the adhering pad 485 by having a contact area with the printed circuit board 484 widened, and the heat is provided to be radiated by use of an impeller 460 and a diffuser unit 470 that are disposed at an inner side of the upper housing 422.

A motor shaft 450, an electronic element 484b, and a heat sink 490 that are not described are identical to the previous descriptions.

Hereinafter, a motor in accordance with an embodiment of the present disclosure will be described.

The descriptions of the structures that are overlapped with the above descriptions will be omitted.

Figure 17:
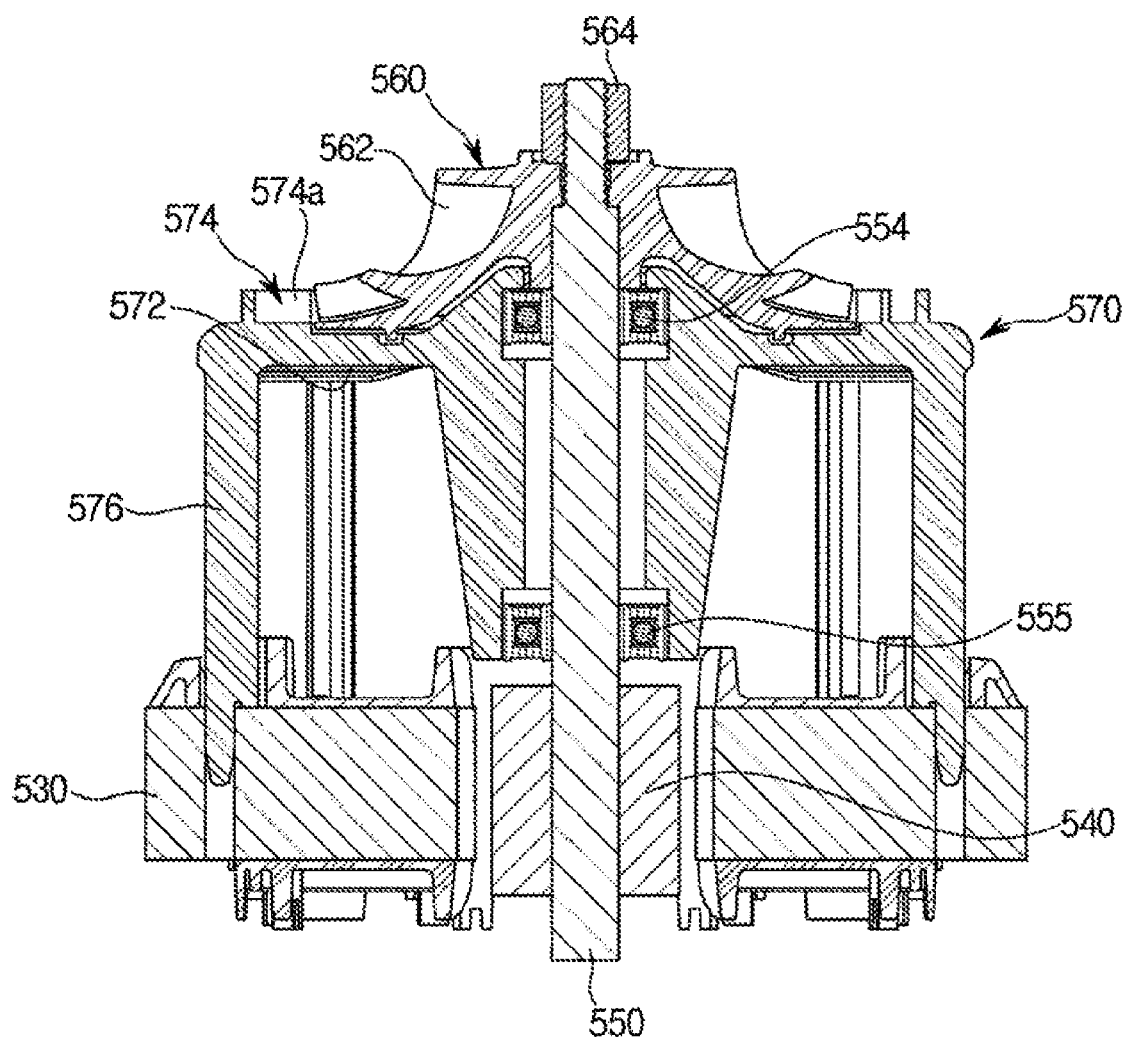
FIG. 17 is a cross-sectional view of a portion of a structure of a motor part assembly in accordance with an embodiment of the present disclosure.

FIG. 17 is a cross-sectional view of a portion of a structure of the motor part assembly in accordance with an embodiment of the present disclosure.

A diffuser unit 570 is fixedly coupled to a stator 530, and may be able to rotatably support a motor shaft 550 by use of a first bearing 554 and a second bearing 555.

The diffuser unit 570 may include a unit body 572, a diffuser unit 574, and an assembly protrusion 576.

The unit body 572, while coupled to the motor shaft 550 by use of the plurality of bearings 554 and 555, may be provided to be fixed regardless of rotations of the motor shaft 550, and is also provided to have a predetermined gap with respect to a lower portion of an impeller 560. In other words, the diffuser unit 570 affixed to the stator 530 may be able to rotatably support the motor shaft 550 by use of the plurality of bearings 554 and 555. In the embodiment of the present disclosure, the plurality of bearings 554 and 555 are illustrated as two bearings for the convenience of descriptions.

The diffuser unit 570 is formed with the material having high heat conductivity, and as the unit body 572 of the diffuser unit 570 is formed to wrap around the plurality of bearings 554 and 555, so that the heat being generated from the plurality of bearings 554 and 555 from the rotations of the motor shaft 550 may be absorbed and exhausted to an outside.

In addition, as the diffuser unit 570 is provided to support the motor shaft 550 by use of the plurality of bearings 554 and 555, the motor shaft 550 may be supportively rotated to be stably rotated. Through the structure as such, with respect to the heat generated by the plurality of bearings 554 and 555 may be further easily radiated, and furthermore, by stably supporting the motor shaft 550, the eccentricity of the motor shaft 550 may be prevented.

The diffuser unit 574 and the assembly protrusion 576 may be identically applied as in the descriptions above.

A rotor 540, a plurality of wings 562, a fixing screw 564, and a plurality of rubs 574a that are not described are identical to the previous descriptions.

The motor according to the present disclosure has an improved structure thereof, thereby facilitating maintenance and repair, and minimizing a misalignment of a concentricity of rotations of the motor.

In addition, a stable control may be provided by improving heat radiation efficiency.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A motor, comprising:
   a control part assembly comprising an air inlet through which air is introduced, an air flow path configured to communicate with the air inlet, a printed circuit board including a plurality of heat sinks arranged around an outer circumference of the air inlet, an inductor disposed to face the printed circuit board and provided to ease rapid changes of current at the printed circuit board, and a control part housing configured to entirely accommodate the plurality of heat sinks, the inductor, and the printed circuit board; and
   a motor part assembly comprising a stator configured to generate magnetic flux when a current is applied, a rotor structured to be rotated while electromagnetically interacting with the stator, a motor shaft provided to be rotated together with the rotor, and an impeller coupled to the motor shaft and provided to be rotated to generate air flow, the motor part assembly configured to be detachably coupled to the control part assembly.

2. The motor of claim 1, wherein:
   the motor part assembly comprises a diffuser unit configured to increase a velocity of the flow of the air being introduced by use of the impeller while affixed to the stator.

3. The motor of claim 2, wherein:
   the diffuser unit comprises a unit body configured to be coupled to the motor shaft by use of a bearing; and
   a plurality of assembly protrusions forming a concentricity with respect to a central portion of the stator and disposed while spaced apart from each other in a circumferential direction along a circumference of the unit body such that the plurality of assembly protrusions is coupled to the stator.

4. The motor of claim 3, wherein:
   the stator comprises a plurality of insertion holes corresponding to the plurality of assembly protrusions allowing the plurality of assembly protrusions to be inserted thereinto.

5. The motor of claim 3, further comprising:
a plurality of bearings disposed along the motor shaft, and
the unit body is configured to rotatably support the motor shaft by use of the plurality of bearings.

6. The motor of claim 1, wherein:
the motor part assembly further comprises a lower housing comprising an air outlet configured to exhaust the air being introduced from the air inlet; and
the lower housing comprises a plurality of housing protrusions coupled to the stator to face the plurality of assembly protrusions and disposed along a circumferential direction while spaced apart from each other.

7. The motor of claim 6, wherein:
the lower housing comprises a mounting recess concavely formed from the lower housing along an outer side of the lower housing; and
the motor part assembly further comprises an upper housing comprising a shroud configured to guide the air being introduced to the impeller and the diffuser unit, and comprising one end portion thereof mounted along the mounting recess.

8. The motor of claim 1, wherein:
the motor part assembly comprises a pair of balancers provided on the motor shaft at an upper side and a lower side with respect to the rotor to prevent eccentric rotations of the rotor.

9. The motor of claim 1, wherein:
the plurality of heat sinks are configured to form the air flow path.

10. The motor of claim 1, wherein:
the printed circuit board comprises a penetration hole configured to penetrate an upper surface and a lower surface; and
each of the plurality of heat sinks is perpendicularly disposed along the surroundings of the penetration hole with respect to the printed circuit board.

11. The motor of claim 1, wherein:
the plurality of heat sinks are provided in the shape of a circle to form the air flow; and
each of the plurality of heat sinks includes an outer surface provided at an opposite side of the inner surface facing the air inlet, wherein the outer surface is formed in the shape of a plane surface such that an electronic element is attachable to the outer surface.

12. The motor of claim 11, wherein:
each of the plurality of heat sinks includes an element coupling hole configured to penetrate the inner surface and the outer surface to be rivet-coupled to the electronic element.

13. The motor of claim 1, wherein:
the plurality of heat sinks are evenly parallel to each other in a circumferential direction;
the inner surface of each of the plurality of heat sinks is formed in the shape of a curve to form the air flow; and
each of the plurality of heat sinks includes an outer surface provided at an opposite side of the inner surface facing the air inlet, wherein the outer surface is formed in the shape of a plane surface such that an electronic element is attachable to the outer surface.

14. The motor of claim 1, wherein:
each of the plurality of heat sinks includes a coupling protrusion in the shape of a pin protruding lengthways to couple to the printed circuit board.

15. The motor of claim 1, wherein:
each of the plurality of heat sinks includes aluminum.

16. The motor of claim 1, wherein:
the control part assembly further comprises an inductor disposed to face the printed circuit board and provided to ease rapid changes of current at the printed circuit board.

17. The motor of claim 16, wherein:
the motor part assembly comprises an impeller rotatably provided while coupled to the rotor;
a diffuser unit configured to increase velocity of the air that flows from the impeller while fixed together with the stator; and
an upper housing comprising a shroud configured to guide the air being introduced to the impeller and the diffuser unit, and
by the coupling of the motor part assembly and the control part assembly, the inductor is disposed at an upper surface of the upper housing.

18. The motor of claim 17, further comprising:
a fixing pad provided in the form of insulated material between the inductor and the upper housing such that the inductor is affixed to the fixing pad.

19. The motor of claim 1, wherein:
the motor part assembly comprises an impeller rotatably provided while coupled to the rotor;
a diffuser unit configured to increase a velocity of the air that flows from the impeller while affixed to the stator; and
an upper housing comprising a shroud configured to guide the air being introduced to the impeller and the diffuser unit, and
by the coupling of the motor part assembly and the control part assembly, the printed circuit board is disposed at an upper surface of the upper housing.

20. A method of assembling a motor, the method comprising:
coupling a motor shaft coupled with a rotor, an impeller rotatably provided together with the motor shaft, and a diffuser unit coupled to the motor shaft by use of a bearing, and
coupling the diffuser to one side of a stator by inserting a plurality of coupling protrusions provided along a circumferential direction of the diffuser into a plurality of coupling grooves formed along an outer side of the stator such that the rotational center of the motor shaft is aligned with the central portion of the stator,
wherein:
a lower housing is coupled to an opposite side of the stator,
an upper housing comprising a shroud is coupled at the lower housing to surround the diffuser, and
a control part assembly configured to deliver electrical signals to the rotor is coupled to the upper housing.

21. The method of claim 20, wherein:
a pair of balancers is coupled at the motor shaft in vertical directions with respect to the rotor to prevent eccentric rotations of the rotor.

22. The method of claim 20, wherein:
the control part assembly is coupled to an upper portion of the upper housing.

23. The assembly method of the motor of claim 20, wherein:
the control part assembly comprises a printed circuit board provided with a penetration hole formed thereto, and a heat sink coupled to the printed circuit board and configured to form air flow while disposed in a circumferential direction along the penetration hole, and the control part assembly is coupled to the motor part assembly such that an end portion of the heat sink and an end portion of the shroud are aligned with each other.

24. A motor, comprising:
a motor part assembly comprising a stator configured to generate a magnetic flux when a current is applied, a rotor structured to be rotated while interacting with the stator electromagnetically, a motor shaft provided to rotate along the rotor, and an impeller rotatably provided to generate air flow while coupled to the motor shaft, and
a control part assembly disposed at one side of the motor part assembly,
wherein the control part assembly comprises:
a printed circuit board configured to transmit electrical signals; and
a heat sink coupled to the printed circuit board, and comprising an outer side surface on which one side of a heat element disposed on the printed circuit board is attached, and comprising an inner side surface that forms an air flow path such that the air being introduced by use of the impeller flows past the inner side surface through the air flow path, and
the heat sink is located entirely upstream of the stator in the air flow path.

25. The motor of claim 24, wherein:
the printed circuit board comprises a penetrating hole configured to penetrate an upper surface and a lower surface; and
the heat sink is perpendicularly disposed along the surroundings of the penetration hole with respect to the printed circuit board.

26. The motor of claim 24, wherein:
the heat sink comprises a plurality of heat sinks provided parallel to each other in a circumferential direction; and
the plurality of heat sinks comprises an inner side surface formed in the shape of a curve to form the air flow; and
an outer side surface provided at an opposite side of the inner side surface and formed in the shape of a plane surface such that the electronic element is attached.

27. A motor comprising:
a rotor;
a stator;
an impeller configured to generate an air flow along an air flow path when the rotor is rotated; and
a controller comprising a heat sink provided along an exterior circumference of the air flow path,
wherein the heat sink includes an inner surface facing the air flow path and is located entirely upstream of the stator in the air flow path.

* * * * *